United States Patent [19]

Breazeale

[11] 3,931,040

[45] Jan. 6, 1976

[54] GAS GENERATING COMPOSITION

[75] Inventor: Jack D. Breazeale, Palo Alto, Calif.

[73] Assignee: United Technologies Corporation, East Hartford, Conn.

[22] Filed: Aug. 9, 1973

[21] Appl. No.: 386,899

[52] U.S. Cl.............. 252/188.3 R; 149/35; 252/188; 252/372; 280/150 AB
[51] Int. Cl.² ...................... C06D 5/06; B60R 21/10
[58] Field of Search............. 252/188.3 R, 186, 188, 252/372; 149/26, 35; 280/150 AB; 423/410

[56] References Cited
UNITED STATES PATENTS

| | | | |
|---|---|---|---|
| 3,741,585 | 6/1973 | Hendrickson et al. | 252/188.3 R |
| 3,773,351 | 11/1973 | Catanzarite | 280/150 AB |
| 3,779,823 | 12/1973 | Price et al. | 280/150 AB |
| 3,814,694 | 6/1974 | Klager et al. | 280/150 AB |

*Primary Examiner*—Leland A. Sebastian
*Assistant Examiner*—Irwin Gluck
*Attorney, Agent, or Firm*—Steven F. Stone

[57] ABSTRACT

A solid composition capable of self-sustained combustion to produce gaseous nitrogen and nonvolatile solids as its combustion products comprises a mixture of a first metal azide and the oxide or salt of a second metal which second metal is below the first metal in the electrochemical series and which is capable of being substituted by the first metal in the oxide or salt. Many combinations of various components may be used, but some care is required to select only those combinations in which the solid products are nonvolatile at the temperatures encountered during the combustion. A representative system employs iron oxide and sodium azide according to the following reactions:

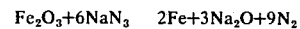

$$Fe_2O_3 + 6NaN_3 \rightarrow 2Fe + 3Na_2O + 9N_2$$

Another embodiment of the invention generates mixtures of nitrogen and other gases such as carbon dioxide, carbon monoxide and/or water particularly suitable for use in lasers. This is accomplished by adding to the mixture materials which react or decompose into the desired gases. If carbon monoxide or carbon dioxide is the desired additional gas, a metal carbonate may be used as the salt in the above reaction.

15 Claims, No Drawings

GAS GENERATING COMPOSITION

BACKGROUND OF THE INVENTION

There are many applications which require a storable source of gaseous nitrogen which may be used for a variety of pressurization or purging applications, for example. Nitrogen is inert with respect to many oxidizers, including the high energy interhalogen compounds such as $ClF_3$ and $ClF_5$, fluorine, oxygen, or various nitric acid compositions such as red fuming and white fuming nitric acid and many fuels such as hydrogen, hydrazine, kerosene, or other hydrocarbons. Thus, in rocket motors for example, it is possible to use nitrogen to pressurize or purge both fuel and oxidizer tanks. Nitrogen is also used in space station and vehicle atmospheres as a diluent for the oxygen. Thus, in the event of leakage not only will oxygen but also nitrogen will be lost and a storable means of replenishing nitrogen in the event of leaks is required. Nitrogen gas is also used in many laser applications and a storable source of gaseous nitrogen would be highly desirable, particularly for portable and military operations. In laser applications for example, it is also desirable that nitrogen contain amounts of other gases such as carbon dioxide, carbon monoxide or water.

There are three basic ways of storing nitrogen, i.e., as a gas, as a liquid, or chemically combined in a manner in which it can be controllably released. Storage as either gas or liquid is done by state-of-the-art techniques, but is associated with the problems inherent to pressurized gases or cryogenic liquids. A substantial body of art, therefore, has been developed towards making so-called nitrogen "candles" which are combustible compositions capable of liberating gaseous nitrogen. Such a composition is represented by U.S. Pat. No. 2,981,616 to Boyer for a Gas Generator Grain. The composition of this patent utilize a metal azide as a source of the nitrogen and an amount of oxidizing agent selected from the class of metal peroxides, inorganic perchlorates and metal nitrates in amounts sufficient to fully oxidize the metal component of the azide. Such compositions are capable of producing nitrogen gas, however, they are relatively energetic systems which can present safety hazards from inadvertent ignition. Further, these oxidizing agents produce high flame temperatures in the combustion process and in many cases the nitrogen gas evolved must be subsequently treated to cool it to a usable temperature and in some cases the temperature may also be so sufficiently high as to produce volatilization of some of the normally solid reaction products.

DESCRIPTION OF THE INVENTION

According to this invention, novel gas generator compositions have been discovered which have substantially no impact or friction sensitivity and which produce nitrogen gas or nitrogen mixed with other gases as the only volatile products at relatively low flame temperatures.

The desirable features of this invention are obtained by reacting metal azides with various metal oxides and salts as the oxidative reactant. To permit self-sustained combustion, the metal forming the azide should be sufficiently above the metal of the oxide or salt in the electromotive series of the elements so that the metal of the azide is capable of exothermically replacing the metal of the oxide or salt. To prevent the liberation of volatiles, other than the desired gases, the metal oxide or salt must be selected such that the residue produced by the reaction consists only of materials which are non-volatile under the reaction conditions. The general reaction sequence may be shown as follows: metal$_1$azide+metal$_2$oxide (or salt)→ metal$_1$oxide(or salt)+metal$_2$+nitrogen In the above reaction metal$_1$ is a metal which is higher in the electromotive series of the elements than metal$_2$ and is capable of replacing the metal$_2$ exothermically in the above general reaction scheme and the stoichiometry of the system is preferably adjusted to permit maximum liberation of the nitrogen of the azide and of metal$_2$ together with the total substitution of metal$_1$ in the oxide or salt.

The addition of a hydrogen-free carbon compound and an oxidizing agent for the carbon in amounts sufficient to convert desired amounts of carbon monoxide to carbon dioxide may be made to the compositions of this invention to permit the generation of nitrogen - $CO_2$ mixtures for use in lasers. Suitable carbon compounds include, without being limited to, carbonates, metal oxalates such as $Li_2C_2O_4$, $Na_2C_2O_4$, and $MgC_2O_4$ and carbon-nitrogen compounds such as tetracyanoethylene ($C_6N_4$).

Elimination or reduction of the additional oxidizer will result in the evolution of carbon monoxide. Addition of hydrated materials or basic oxides such as $Mg(ClO_4)_2 \cdot 6H_2O$, $FeO_2H$, oxamide and oxalic acid dihydrate either alone or in conjunction with the carbon compound will generate water. The formulas for oxamide and oxalic acid dihydrate are respectively $(CO.NH_2)_2$ and $(COOH)_2 \cdot 2H_2O$.

Representative theoretical chemical reactions by which these gases may be generated are set forth below:

NITROGEN GENERATORS

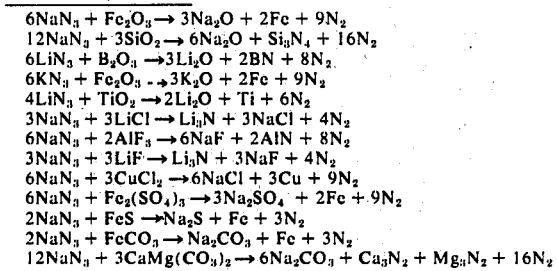

NITROGEN-CARBON DIOXIDE GENERATORS

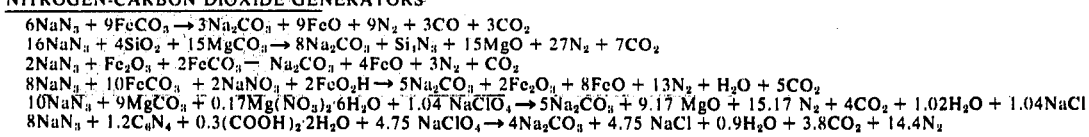

Table I sets forth the results of tests on various gas generator compositions.

TABLE I

(A) Compositions of Pelletized Propellants - no Reinforcing Fiber

| Mole % $NaN_3$ | Component (1) | Mole % | Component (2) | Mole % | Mole Ratio | Solid Residue Reaction Products | Ignition & Combustion Behavior | Combustion Temperature |
|---|---|---|---|---|---|---|---|---|
| 60.0 | $AlF_3$ | 40.0 | — | — | 3/2 | $Na_3AlF_6$+AlN | ignited-slow burning rate | 940 |
| 85.7 | $Al_2O_3$ | 14.3 | — | — | 6/1 | $Na_2O$+AlN | no ignition with sustained burning | — |
| 85.7 | $Al_2O_3$ | 8.7 | $Fe_2O_3$ | 5.6 | ~77/8/5 | $Na_2O$+Fe+AlN $Na_2Fe_2O_4$(?) | ignited-moderate burning rate | 1020-1090 |
| 85.7 | $B_2O_3$ | 14.3 | — | — | 6/1 | $Na_2O$+BN | slow to ignite-moderate burning rate | 830 |
| 49.2 | $CaCO_3$ | 36.5 | $FeO_3$ | 14.3 | ~17/13/5 | $Na_2O$+CaO+Fe | ignited-moderate burning rate | — |
| 50.0 | CuCl | 50.0 | — | — | 1/1 | NaCl+Cu | ignited-very rapid burning rate | 686 |
| 66.7 | CuO | 33.3 | — | — | 2/1 | $Na_2O$+Cu | ignited-moderate burning rate | >1200 |
| 85.7 | $Fe_2O_3$ | 14.3 | — | — | 6/1 | $Na_2O$+Fe | ignited easily-good burning rate | 940 |
| 66.4 | $FeCO_3$ | 33.6 | — | — | 2/1 | $Na_2CO_3$+Fe+FeO | ignited-fairly rapid burning rate | — |
| 88.9 | $Fe_3O_4$ | 11.1 | — | — | 8/1 | $Na_2O$+Fe | ignited-moderate burning rate | ~566 |
| 85.7 | $Fe_2(SO_4)_3$ | 14.3 | — | — | 6/1 | $Na_2SO_4$+Fe | ignited-moderate burning rate | — |
| 66.7 | FeS | 33.3 | — | — | 2/1 | $Na_2S$+Fe | ignited-fairly rapid burning rate | — |
| 49.5 | LiCl | 50.5 | — | — | 1/1 | NaCl+$Li_3N$ | ignited (after dehydration)-moderate burning rate | — |
| 49.8 | LiF | 50.2 | — | — | 1/1 | NaF+$Li_3N$ | ignited-extremely slow burning rate | — |
| 88.8 | $Li(CO_2)_2$ | 11.2 | — | — | 8/1 | $Na_2O$+$Li_3N$ | ignited-moderate burning rate | — |
| 66.6 | $Li_2SO_4$ | 33.5 | — | — | 2/1 | $Na_2SO_4$+$Li_3N$ | ignited, but not sustained combustion | — |
| 46.4 | $MgCO_3 \cdot xH_2O$ | 53.6 | — | — | ~1/1 | $Na_2CO_3$+$Mg_3N_2$ | no ignition with sustained burning | — |
| 61.3 | $MgCO_3 \cdot xH_2O$ | 38.7 | — | — | ~3/2 | $Na_2CO_3$+$Mg_3N_2$+Fe | ignited-extremely slow burning rate | — |
| 80.0 | $MnO_2$ | 20.0 | — | — | 4/1 | $Na_2O$+Mn | ignition difficult-moderate burning rate | 740 |
| 80.0 | $SiO_2$ | 20.0 | — | — | 4/1 | $Na_2O$+$Si_3N_4$ | ignited easily-fairly rapid burning rate | 760 |
| 75.0 | $SiO_2$ | 25.0 | — | — | 3/1 | $Na_2SiO_3$ | ignited-fair to moderate burning rate | 893 |

(B) Compositions of Molded Propellants - Fiberglass Binder (1 wt %)

| Mole % $NaN_3$ | Component (1) | Mole % | Component (2) | Mole % | Mole Ratio | Solid Residue Reaction Products | Ignition & Combustion Behavior |
|---|---|---|---|---|---|---|---|
| 56.4 | $AlF_3$ | 43.6 | — | — | 4/3 | $NaAlF_4$(?)+NaF | ignited-moderate burning rate |
| 21.0 | $AlO_3$ | 10.5 | $SiO_2$ | 68.4 | 12/6/37 | $Na_2O \cdot Al_2O_3 \cdot 6SiO_2$ silicate | no ignition with sustained burning |
| 20.3 | $Al_2O_3$ | 4.9 | $SiO_2$ | 74.8 | ~25/6/90 | $Na_2O \cdot Al_2O_3 \cdot 6SiO_2$ silicate | no ignition with sustained burning |
| 42.0 | $Al_2O_3$ | 7.8 | $SiO_2$ | 50.2 | ~24/6/39 | $Na_2O \cdot Al_2O_3 \cdot 6SiO_2$ silicate | ignited, but very slow burning rate |
| 83.3 | $Al_2O_3$ | 6.1 | $SiO_2$ | 10.6 | 13.7/1/1.7 | sodium ferrate or sodium aluminate | ignition easy-good burning rate |
| 61.9 | $Al_2O_3$ | 12.9 | $Fe_2O_3$ | 25.2 | ~4.8/1/2 | sodium ferrate or sodium aluminate | ignited-less rapid burning rate |
| 69.9 | $Al_2O_3$ | 18.7 | $Fe_2O_3$ | 11.4 | ~6.1/1.6/1 | sodium ferrate or sodium aluminate | ignited-slow burning rate |
| 48.9 | $Al_2O_3$ | 31.3 | $Fe_2O_3$ | 19.9 | ~2.5/1.6/1 | sodium ferrate or sodium aluminate | ignited-very slow burning rate |
| 25.2 | $Al_2O_3$ | 46.1 | $Fe_2O_3$ | 28.7 | ~1/1.8/1.1 | sodium ferrate or sodium aluminate | no ignition |
| 70.0 | $Al_2O_3$ | 23.5 | $Fe_2O_3$ | 6.5 | ~10.8/3.6/1 | sodium ferrate or sodium aluminate | no ignition with sustained burning |
| 54.0 | $Al_2O_3$ | 36.1 | $Fe_2O_3$ | 9.9 | 5.5/3.6/1 | sodium ferrate or sodium aluminate | ignited, but would not sustain combustion |
| 23.6 | $Al_2O_3$ | 60.4 | $Fe_2O_3$ | 16.0 | 1.5/3.8/1 | sodium ferrate or sodium aluminate | no ignition |
| 27.4 | $Al_2O_3$ | 25.7 | $Fe_2O_3$ | 46.9 | 1.1/1/1.8 | sodium ferrate or sodium aluminate | no ignition with sustained combustion |
| 64.9 | $CaCO_3$ | 24.3 | $Fe_2O_3$ | 10.8 | 6/2.2/1 | $Na_2CO_3$+CaOFe | ignited-moderate burning rate |
| 77.8 | $CaMg(CO_3)_2$ | 9.3 | $Fe_2O_3$ | 12.9 | 8.4/1/1.4 | $Na_2CO_3$+MgO+λCaO+Fe | ignited-moderate burning |

TABLE I-continued (B) Compositions of Molded Propellants-Fiberglass Binder (1 wt %)

| Mole % NaN$_3$ | Component (1) | Mole % | Component (2) | Mole % | Mole Ratio | Solid Residue Reaction Products | Ignition & Combustion Behavior | Combustion Temperature |
|---|---|---|---|---|---|---|---|---|
| 85.7 | Fe$_2$O$_3$ | 14.26 | — | — | 6/1 | Na$_2$O+Fe | ignited easily-fairly rapid burning rate | |
| 82.0 | Fe$_2$O$_3$ | 18.0 | — | — | 4.56/1 | Na$_2$O+Fe+Fe$_2$O$_3$ | ignited-less rapid burning rate | |
| 71.1 | Fe$_2$O$_3$ | 28.9 | — | — | 2.46/1 | Na$_2$O+Fe+Fe$_2$O$_3$ | ignited moderate burning rate | |
| 54.3 | FeCO$_3$ | 45.7 | — | — | ~1/1 | Na$_2$CO$_3$+Fe | ignited-slow burning rate | |
| 45.3 | FeCO$_3$ | 42.4 | Fe$_2$O$_3$ | 12.3 | 3.7/3.4/1 | Na$_2$CO$_3$+Fe+Fe$_2$O$_3$ | ignited-slow burning rate | |
| 57.7 | FeCO$_3$ | 32.4 | MgCO$_3$.xH$_2$O | 9.9 | 5.8/3.3/1 | Na$_2$CO$_3$+MgO+Fe | ignited-slow burning rate | |
| 51.4 | FeCO$_3$ | 28.8 | MgCO$_3$.xH$_2$O | 19.8 | 2.6/1.5/1 | Na$_2$CO$_3$+MgO+FeO | no ignition with sustained burning | |
| 46.0 | MgCO$_3$.xH$_2$O | 40.6 | Fe$_2$O$_3$ | 13.4 | 3.4/3.0/1 | Na$_2$CO$_3$+MgO+FeO | no ignition with sustained combustion | |
| 57.7 | SiO$_2$ | 42.3 | — | — | 4/3 | Na$_2$SiO$_3$+Si$_3$N$_4$ | ignited-very rapid burning rate | |

As can be seen by comparing the theoretical reactions and the actual experimental reactions noted in Table I, some differences between the experimental result and the theoretical expectations are observed. For example, in the reaction of aluminum fluoride with sodium azide, the reaction does not proceed to the production of aluminum nitride and sodium fluoride but rather Na$_3$AlF$_6$ and AlN is produced. Also, as can be seen from the above table, it is not always possible to predict which combinations of materials will function properly according to this invention and in what particular relationship they may occur. For example, in the system using lithium azide, aluminum oxide, silicon dioxide, and 1 percent fiberglass reinforcement, no combustion was obtained when the mole ratio of the materials were respectively 12/6/39 and 25/6/90, yet good residue retention was obtained with a mole ratio of 24/6/39. It has not been determined if this was because of the increased amount of sodium azide, decreased amount of silicon oxide or some combination of the two with the latter being the most probable. Thus, while the applicant has not tested every combination of materials in all proportions to determine which do and which do not function to produce a gas generator grain capable of generating nitrogen in self sustained manner at reasonable temperatures, this disclosure is believed adequate to teach workers skilled in the art a new type of composition and how generally to determine which materials will work. Nevertheless, some experimentation, well within ordinary skill, will be required by workers skilled in the art to select the precise composition for any particular combination of materials within the scope of this disclosure and the claims but which are not specifically disclosed by example herein. While this invention has been illustrated with respect to numerous examples, the invention is not limited thereto and various modifications can be made by workers skilled in the art without departing from the scope of the invention which is limited only by the following claims wherein:

We claim:

1. A gaseous nitrogen generating composition comprising a mixture of a metal azide and a material selected from the group consisting of: Fe$_2$O$_3$, AlF$_3$, Al$_2$O$_3$+Fe$_2$O$_3$, B$_2$O$_3$, CuCl, CuO, Fe$_3$O$_4$, MnO$_2$, SiO$_2$, TiO$_2$ and mixtures thereof, said materials being oxides and salt of elements lower in the electrochemical series of the elements than the metal component of the azide and being capable of liberating sufficient heat upon exothermic reaction with said azide to maintain a self-sustained combustion.

2. The composition of claim 1 wherein said metal azide is selected from the group consisting of alkali metal azides.

3. The composition of claim 2 further comprising a material selected from the group consisting of carbon-nitrogen compounds, metal oxalates and metal carbonates.

4. The composition of claim 3 wherein said carbon-nitrogen compounds, metal oxalates and metal carbonates are selected from the group consisting of tetracyanoethylene, Li$_2$C$_2$O$_4$, Na$_2$C$_2$O$_4$, MgC$_2$O$_4$, CaCO$_3$, FeCO$_3$, MgCO$_3$, MgCa(CO$_3$)$_2$ and mixtures thereof.

5. The composition of claim 4 further comprising an oxidizing agent selected from the group consisting of NaNO$_3$, NaClO$_4$, LiNO$_3$, LiClO$_4$, NaClO$_3$, Mg(ClO$_4$)$_2$.

6. The composition of claim 4 further comprising a material selected from the group consisting of FeO(OH), Mg(ClO$_4$)$_2$.6H$_2$O, (COOH)$_2$.2H$_2$O and oxamide.

7. The composition of claim 6 further comprising a material selected from the group consisting of NaNO$_3$, NaClO$_4$, LiNO$_3$, LiClO$_4$, NaClO$_3$ and Mg(ClO$_4$)$_2$.

8. The composition of claim 1 wherein said azide is sodium azide and said material is Fe$_2$O$_3$.

9. The composition of claim 1 wherein said azide is sodium azide and said material is CuCl.

10. The composition of claim 1 wherein said azide is sodium azide and said material is Al$_2$O$_3$+Fe$_2$O$_3$.

11. The composition of claim 1 wherein said azide is sodium azide and said material is SiO$_2$.

12. The composition of claim 1 wherein said azide is sodium azide and said material is CuO.

13. The composition of claim 1 wherein said azide is sodium azide and said material is B$_2$O$_3$.

14. The composition of claim 1 further comprising a fiberous binder.

15. The composition of claim 7 further comprising a fiberous binder.

* * * * *